(12) United States Patent
Yellepeddy et al.

(10) Patent No.: US 7,191,192 B2
(45) Date of Patent: Mar. 13, 2007

(54) METADIRECTORY AGENTS HAVING EXTENSIBLE FUNCTIONS

(75) Inventors: Krishna Kishore Yellepeddy, Austin, TX (US); Rod Mancisidor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 10/262,033

(22) Filed: Sep. 30, 2002

(65) Prior Publication Data

US 2004/0064502 A1    Apr. 1, 2004

(51) Int. Cl.
*G06F 17/30* (2006.01)

(52) U.S. Cl. ............... 707/104.1; 707/204; 707/101; 707/10; 707/9; 713/166; 713/180; 713/198

(58) Field of Classification Search ............... None
See application file for complete search history.

(56) References Cited

U.S. PATENT DOCUMENTS

| | | | |
|---|---|---|---|
| 5,276,874 A | 1/1994 | Thomson | 707/102 |
| 5,630,116 A | 5/1997 | Takaya et al. | 395/617 |
| 5,838,923 A | 11/1998 | Lee et al. | 395/200 |
| 5,860,078 A | 1/1999 | Emmot | 711/3 |
| 6,052,799 A | 4/2000 | Li et al. | 714/13 |
| 6,078,952 A | 6/2000 | Fielding et al. | 709/221 |
| 7,107,297 B2* | 9/2006 | Yellepeddy et al. | 707/204 |
| 2003/0145003 A1* | 7/2003 | Yellepeddy et al. | 707/6 |
| 2004/0225680 A1* | 11/2004 | Cameron et al. | 707/104.1 |

FOREIGN PATENT DOCUMENTS

EP    204993    12/1986

OTHER PUBLICATIONS

New Microsoft Metadirectory Services Ease Deployment, ENT News, down loaded from http://www.entmag.com on Nov. 5, 2001, 1 page. cited byother.*
"New Microsoft Metadirectory Services Ease Deployment", ENT News, down loaded from http://www.entmag.com on Nov. 5, 2001, 1 page.
"Microsoft Metadirectory Services Concepts and Architecture", downloaded from http://www.microsoft.com on Nov. 5, 2001, 34 pages.

* cited by examiner

*Primary Examiner*—Jean M. Corrielus
(74) *Attorney, Agent, or Firm*—Robert H. Frantz; Jeffrey S. LaBaw

(57) ABSTRACT

A bidirectional metadirectory agent a data source converter layer; a filters and rules layer for blocking disallowed changes; a mapping layer for translating attributes in change commands from a local set of attribute names to a set of metadirectory attribute names, and vice versa, and for converting change commands between said agent-internal common format and a directory change protocol; an extensible user customization layer for implementing custom metadirectory agent functions; and a metadirectory interface for sending and receiving said change commands in said directory change protocol.

49 Claims, 14 Drawing Sheets

METADIRECTORY AGENTS HAVING EXTENSIBLE FUNCTIONS

CROSS-REFERENCE TO RELATED APPLICATIONS (Claiming Benefit Under 35 U.S.C. 120)

This application is related to U.S. patent application Ser. No. 10/044,998, filed on Jan. 10, 2002, by Krishna Yellepeddy.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 10/044,998, filed on Jan. 10, 2002, by Krishna Yellepeddy is hereby incorporated by reference in its entirety, including figures.

BACKGROUND OF THE DISCLOSURE

1. Field of the Invention

This invention relates to, but is not limited to, technologies for implementing and interfacing to metadirectories via portal servers.

2. Background of the Disclosure

Computing enterprises, whether large or small, comprise numerous directories, network operating systems and databases in which corporate data, client information, and employee data is stored.

In some scenarios, the data to be managed is contained in a homogeneous environment, e.g. the forms and formats of the data are similar or compatible. In such a case, a periodic "synchronization" process is executed which compares the contents of the distributed data objects, and selectively copies or updates all data sources to contain appropriate data.

For example, an email server's message storage format is usually the same as the storage formats on the email client machines. So, when a client machine logs into the email server, the server can quickly determine if there are any "new" messages (e.g. messages in the server's storage which have not been copied to the client's storage), and transmit those messages to the client machine. Larger scale homogeneous database synchronization is enabled by many distributed database products, such as IBM's Lotus Notes [™] product.

However, many data sources which contain related or partially related data objects are not homogenous with each other, but rather are heterogeneous in nature. For example, information relating to a corporate employee "John Smith" may be contained in many different data stores within a corporate Intranet. His employee records (hire date, pay scale, home address, dependent names, etc.) may be contained in an Oracle database on an Human Resources server, while his current assignment information may be stored in a departmental or divisional server (department, manager's name, email address, etc.) in a Lotus Notes system.

One available technology for managing data objects in heterogeneous data sources is the Lightweight Directory Access Protocol ("LDAP"), and open industry standard for remotely querying and modifying data objects within an LDAP-enabled directory. This protocol reduces query and change operations to a uniform LDAP operation which can be interpreted by the LDAP-enabled servers in order to make changes to data objects in directories.

LDAP enables a user to locate organizations, individuals, and other resources such as files and devices in a network, whether on the public Internet or on a corporate intranet. LDAP is a minimized version of Directory Access Protocol (DAP), which is part of the X.500 standard for directory services in a network.

Some directories, such as LDAP directories, have support for a change log which records the changes that have been made to the directory. For directories which do not support change logs, users or administrators sometimes develop their own mechanisms for detecting changes in a directory. These techniques usually include polling the directory(ies), identifying any changes which have been made since the last poll operation, and upon detection of a change, report that an entry has been modified, usually listing out all the attributes for the changed entry.

In the following example, a phone number in an entry for a person "John Smith" in a Human Resources database at XYZ corporation is to be updated to equal "838-1180", and his department is to be changed to department "6". The original entry with five fields may appear as shown in Table 1.

TABLE 1

Example Original Entry full_name="John Smith"
PhoneNumber="838-1178"
UserID="jsmith"
Division=92
Department=5
email="jsmith@xyzcorp.com"

where the entry is of the format:

full_name,PhoneNumber,UserID,Division,Department, email

A user-written script may poll the directory containing the changed entry, which generates a record in the change log. Records in the change log reflect the change to the entry as the series of LDAP modify operations shown in Table 2.

TABLE 2

Example LDAP Change Log

DN:cn=John Smith, ou=Austin,o=xyz
changetype:modify
replace:PhoneNumber
    PhoneNumber:838-1180
changetype:modify
replace:UserId
    UserID:jsmith
changetype:modify
replace:Division
    Division:92
changetype:modify
replace:Department
    Department:6
changetype:modify
replace:email
    email:jsmith@xyzcorp.com The resulting update to the other directories in the metadirectory are simply made in their entirety to every data object, including fields which were not actually modified, as typical user-developed scripts do not attempt to identify the actual fields of data which were updated or modified.

If the polling operation is relatively fast compared to a series of single-field modification operations, the user-developed solution will detect each individual change, and update each entry (all fields at once) multiple times throughout the metadirectory.

This often results in many redundant entry updates throughout the metadirectory just to achieve small, incremental changes in the actual data. When realistic organizations of data sources are considered which may comprise hundreds of data sources each with several thousand entries, the system performance impact of these redundant updates is readily apparent.

Besides being an inefficient use of computing resources, this can cause considerable problems in overall system operation, as these updates are propagated over computer networks and consequently consume communications bandwidth and intermediate storage memory unnecessarily.

Another drawback of the LDAP approach is that legacy directories may be in existence indefinitely, and not all legacy directories may be upgraded to LDAP compatibility. Further, LDAP actually only provides a common access protocol (e.g. remote method of accessing the directory), but does not provide in itself actual heterogeneous data source management functions.

While some LDAP replication standards are in development but are as yet unfinished, many existing proprietary approaches are different and incompatible. In any case, replication and synchronization, whether proprietary or standards-based, are insufficient for meeting the needs of enterprise-wide heterogeneous data source directory management.

The term "metadirectory" refers to a class of enterprise directory management tools which provide means to manage and synchronize two or more directories containing heterogeneous data sources. In order to manage disparate heterogeneous data sources, a typical metadirectory product may require the individual data sources (e.g. directories, files, databases, etc.) to export their data to a common format, and then exchange that data with the metadirectory using file transfer, electronic mail, or other data transfer protocol. After the metadirectory receives the files from the data sources, an administrator can add or modify the data from the metadirectory. One such product is the VIA product, originally provided by the Zoomit Corporation, which was acquired by Microsoft Corporation.

Metadirectories are extremely useful for system administration and security management, as they can be used as an integration point to simplify existing solutions and to create new web-based applications. For example, every application has its own proprietary method or scheme of storing information associated with that application, whether it be user information, security information, configuration settings, etc.

Through use of metadirectories, these various data stores may be stored once and integrated so that they may be managed and administered as a single entity (according to the rules and constraints of the metadirectory), thereby reducing the total cost of maintaining this information while increase the security and reliability with which it is handled.

Because current metadirectory products, however, may require the various data sources to be able to export their data into these "common" formats, data sources which do not support such export operations may be excluded from inclusion in a metadirectory.

Another problem in managing entries from multiple heterogeneous data sources according to the present processes is that the information may not have been entered consistently in these data sources, e.g. there may be logical synonyms within the entries that are not exact character-string matches. For example, in three data sources managed within a single metadirectory, each data source containing information for "Robert Smith", the name "Robert Smith" may have been entered as follows:

Robert Smith in data source 1
Bob Smith in data source 2
Rob Smith in data source 3.

Typical metadirectory products provide very little in the way of automatically resolving or detecting these alias or related entries, and often require the administrator to manually intervene to manage these data objects. Traditional approaches to propagating changes to such records containing synonyms would be to propagate a change for each record variant. In this example, to effectively update the mailing address for "Robert Smith" throughout the metadirectory, an administrator would first have to be aware of the three available synonyms, and then manually execute three separate changes which would be propagated throughout the metadirectory.

The system and method disclosed in the related application minimizes the system performance impact of propagating updates to entries in metadirectories. Additionally, this system cooperates with and extends the capabilities of existing metadirectory tools and technologies while providing user or administrator configurability and control.

Because metadirectories present an opportunity to uniformly manage and access a variety of types of data, it would be highly useful to be able to access data in a metadirectory via a portal to provide additional usefulness to users.

Additionally, as changes to traditional metadirectories may be made by properly submitting a change to a joined data source, there is a need to provide security, authentication, authorization, and data integrity assurance to prevent incorrect or unauthorized changes from being implemented. As such, metadirectories which provide portal servers with intercommunication, security, filtering and personalization features would be useful.

BRIEF DESCRIPTION OF THE DRAWINGS

FIG. 12 illustrates a logical process for source authentication as performed by a metadirectory agent such as a metadirectory agent plug-in.

FIG. 13 shows a logical process for source identification as performed by a metadirectory agent such as a metadirectory agent plug-in.

SUMMARY OF THE DISCLOSURE

Figure 1:
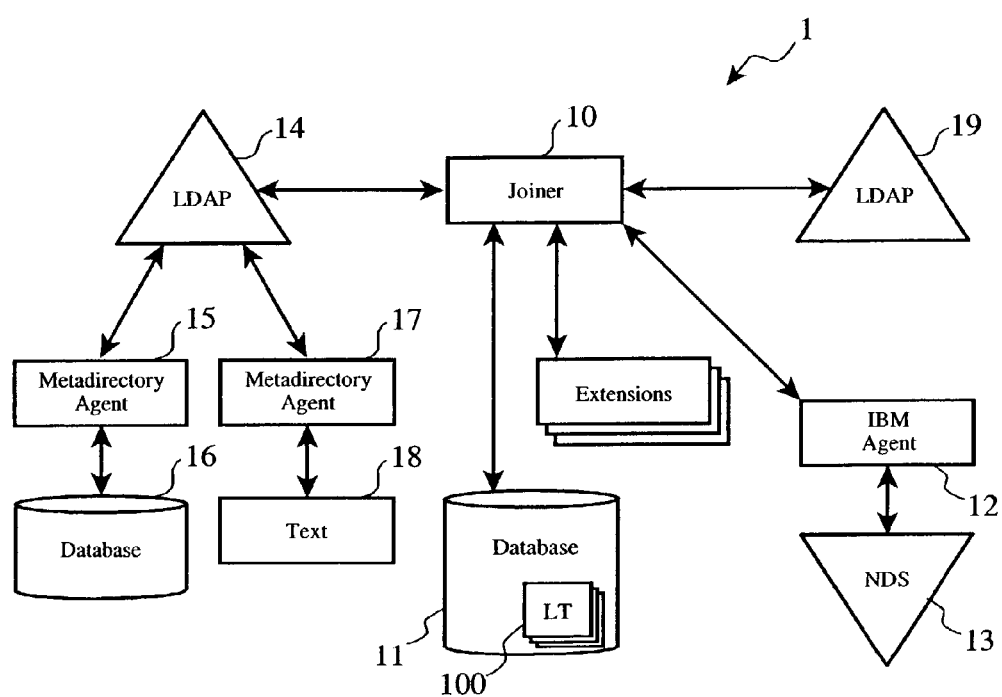
FIG. 1 shows an arrangement of components of metadirectories.

A consistent architecture for metadirectory and portal server deployment enabling integration with portal servers is provided, which allows access to unstructured as well as structured data via the portal. Some data sources such as directories, databases, user registries, etc., contain "structured data" (i.e. database records), while others contain "unstructured data" (i.e. email and documents).

Both kinds of data are supported by the metadirectory disclosed herein. Structured and unstructured data are mapped into a standards-based format entry format, such as an LDAP format. This allows, for example, the metadirectory to work with data from an Oracle database, a file system, and a Domino discussion database, all of which have considerably different formats and structures of data contained within them. A portal server functionality is also provide, including security filtering and personalization. Through the portal server functionality, the metadirectory contents may be accessed and/or modified by any number of systems served by the portal server.

DETAILED DESCRIPTION

In one embodiment, the system may be realized as an extension to the well-known Tivoli SecureWay[™] enterprise computing product. However, other suitable realizations will be readily recognizable by those skilled in the art, such as inline code changes or other techniques typically used to add functionality to other metadirectory management software and products. Such alternate metadirectory management software products include, but are not limited to, the VIA product from Microsoft Corporation.

The system and method disclosed herein allows administrators to specify rules for criteria for matching objects from one directory to another, rules for attribute and object ownership, and rules for filtering attributes. For example, a rule may be established for a component in a metadirectory which contains employee salary information to prohibit that information from being replicated or copied into other directories, files or databases.

A metadirectory may have some or all of the following capabilities:

(a) it synchronizes information between one or more connected heterogeneous data source and a metadirectory;

(b) it is configurable as to which data sources are to be synchronized;

(c) it is able to flow a pointer such as an LDAP Universal Resource Locator ("URL") to the information that a metadirectory must resolve for the metadirectory user; and (d) it provides a method to replicate data from the multiple heterogeneous data sources according to administrator-defined configuration and rules.

Thus, the metadirectory provided by the present system and method is, in one possible embodiment, an enterprise management tool which integrates multiple different name spaces into a logical single name space, in order to provide a common information model (e.g. schema), consolidated client access to information from all connect directories, and a means for managing the multiple different directories in a unified manner. The metadirectory, however, does not imply physical consolidation of information into a single, master "mega-directory", nor is it a directory synchronization and replication tool.

Further, our metadirectory interconnects through importing, changing and exporting data to and from heterogeneous data sources including, but not limited to, databases (i.e. DB2, Oracle, etc.), Lotus Notes, Novell Directory Services, Netscape, OS/2 directories, Windows NT data sources, etc.

Turning to FIG. 1, one embodiment of our metadirectory architecture (1) is shown. The Joiner (10) is a central hub where information is integrated and synchronized, and it is extensible through the use of Java beans (100).

The Joiner (10) communicates with connected data sources ("DS"), such as databases (11, 16), either directly or through an Metadirectory Agent (12, 15, 17). It merges entries of the same object type from different data sources together, such as text files (18), records in a database (16, 11), networked data storage items (13), or other remotely accessible data stores, such as LDAP directories (14, 19). The Joiner (10) keeps a copy of the joined data from each data source in a relational database, preferably in a DB2 database. Each object type for each data store is contained in a local table ("LT") (100).

Each object joined entry for a data store is reflected as a row entry in the corresponding LT. A column is added which contains a unique key or "Match key", which is used to identify the same instance of the object for all the data stores.

Metadirectory Agents (17) communicate to the Joiner (10) any changes which are made to a joined object in a directory or data source within the metadirectory. These changes are stored in a change log that is transmitted to the Joiner. The Joiner then evaluates whether these changes are valid, and then propagates them to the other directories within the metadirectory.

As such, the Joiner provides the following functions:

(a) disparate information sources about a single entity or common subject are grouped into a single entry in the metadirectory through linking information in multiple data into an aggregate;

(b) all resources in an organization are represented by a Join; and (c) rules are administrator-definable to enable a "fuzzy" match between different data sources.

Figure 2:
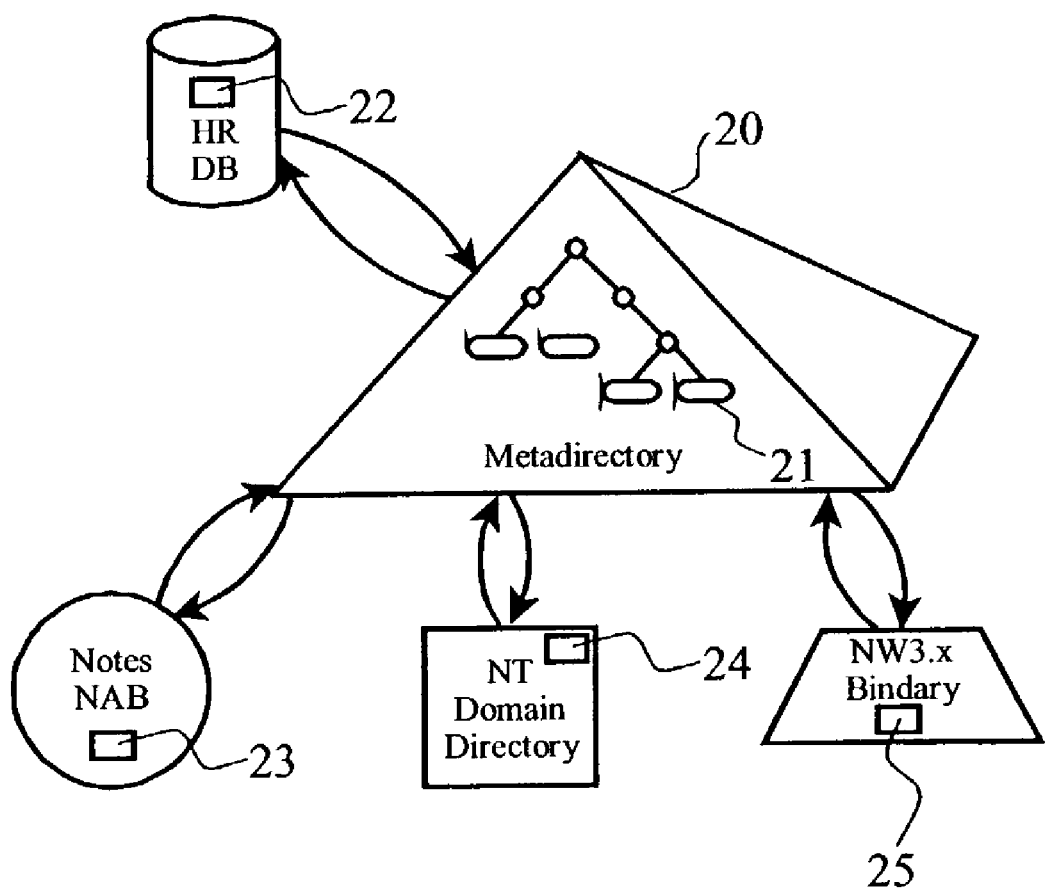
FIG. 2 discloses an exemplary metadirectory for illustrative purposes.

FIG. 2 further illustrates the Join operation using an example. A human resources database may contain a first entry (22) for an employee "Clark Kent", including his employee number, surname, first name, title, work telephone number, department, date of hire, salary, home address, home telephone number, and medical notes. In a Notes Name and Address book ("NAB"), there may be an entry (23) for Mr. Kent containing his user name, user short name, location of his mail server and mail file, and his email address for external email to and from the Internet. In an NT domain directory, there may be an entry (24) for Mr. Kent including a UserID, password, ServerID, and list of groups to which he belongs. Further, in a Novellware bindary, there may be a user object and one or more routing tables (25) defining how to route messages to and from Mr. Kent.

The basic join operation performed by the metadirectory (20) merges selected data items from each of these data sources to create an entry (21) in a local table for Mr. Kent. Objects from data sources which are not merged or joined are filtered. This prevents cluttering the metadirectory with data items which are not commonly needed from the unified view of the metadirectory. For example, the surname, first name, title, work telephone number and department from the HR database may be exported to the metadirectory, filtering out the other attributes (employee number, date of hire, etc.). Additionally, the user objects from the Novellware bindary may be exported to the metadirectory, while filtering out the routing tables for Mr. Kent.

This flexible management control balances the issues of centralized control versus local autonomy depending upon a specific organizations information ownership and security requirements. It allows "tops-down" or "bottoms-up" to accommodate a range of "geo-political" scenarios. Further, the metadirectory ("MD") may be a master, slave or peer to the managed data sources, which determines which entities may create, modify and delete data objects. Through flexible attribute content control (e.g. filtering configuration), bidirectional flow is defined separate from the object creation, modification and deletion definitions.

Figure 3:
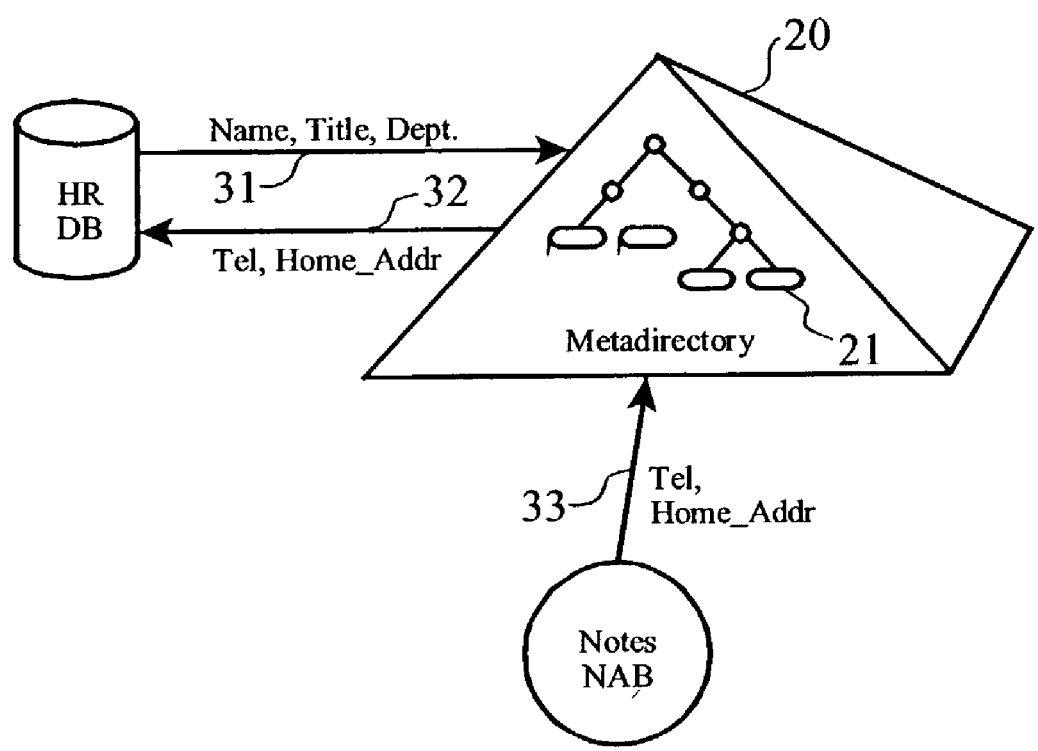
FIG. 3 provides a detailed example of a possible set of attribute names and values merged by a metadirectory.

Continuing with this example for illustration, the human resources ("HR") department may control the creation and deletion of certain attributes (fields) within the HR database, while allowing the metadirectory to create or delete other certain attributes within the HR database. As such, for example in FIG. 3, the HR staff may modify the name, title and department attributes (31) for each employee, while the metadirectory may make changes to the telephone and home address attributes (32), which may be propagated (33) from other department data sources, perhaps the Notes Name and Address Book.

Figure 4:
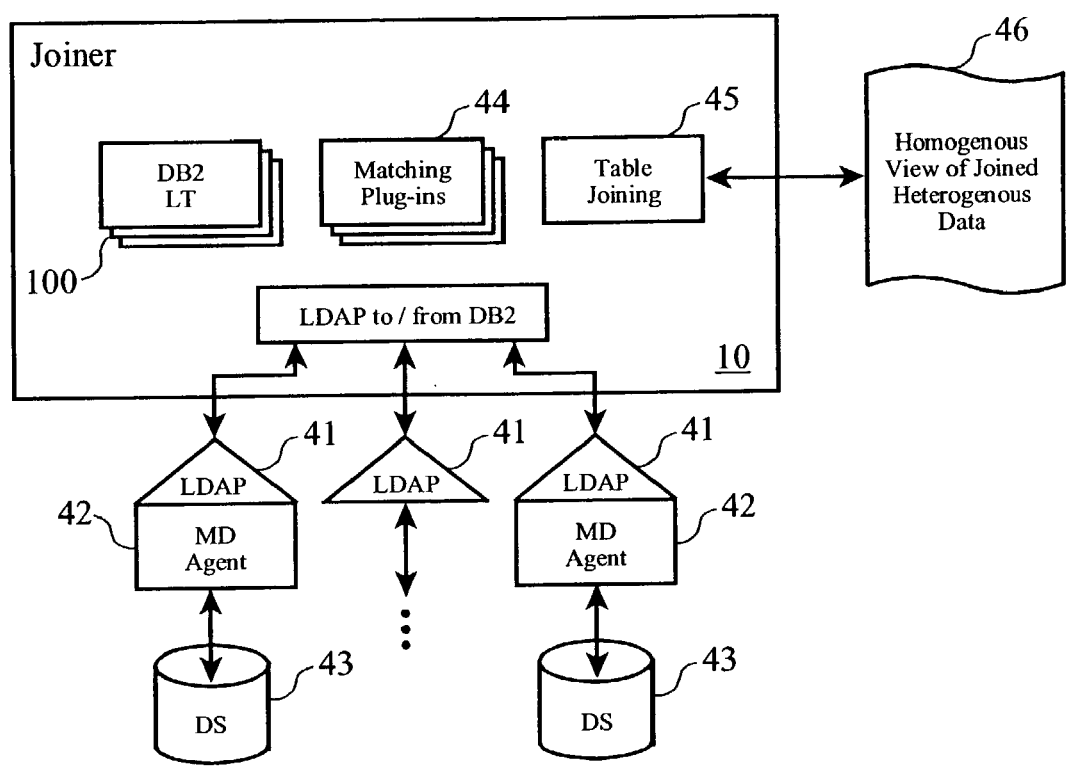
FIG. 4 gives details of the construction of a metadirectory.

Turning to FIG. 4, a detailed view of one possible embodiment of the architecture of the Joiner (10) is provided. The Joiner (10) may receive data object changes from metadirectory agents (42) associated with Data Sources ("DS") (43), preferably in LDAP change operation format. The Joiner (10) may also send changes to the data sources (43). Each MD agent (42) is provided with an appropriate interface, such as an LDAP interface (41).

Within the Joiner (10), a local table (100) associated with each data source (43) is maintained in a common format, preferably in DB2 format, but alternately in any other suitable format. These multiple local tables are then combined to created a joined table ("JT") by a table joining function (45), which provides a homogenous view (46) of the joined heterogeneous data. The JT data is preferably stored on an LDAP server such that users may view and access the JT data.

In order to properly identify data items which must be changed, responsive to changes received from a data source or an administrator, there are two problems to solve. Each data item includes an attribute name and attribute value. For example, in an HR database, there may be an attribute (e.g. column) "surname" in each record. For the record (e.g. row) in the HR database for our example Clark Kent, the value of the attribute "surname" may be "Kent".

The first problem with accurate matching involves resolving aliases or synonyms of values of attribute values, within a single data source and between data sources. For example, "Bob", "Robert", and "Rob" may all be synonymous of each other when found in an attribute "First_Name" in the HR database. Standard matching rules, such as "Rob*" where "*" is a "wild card" character or string, would not yield a match for "Bob". A modified matching rule such as "*ob*" would find the alias "Bob", but would also find "Job" in error.

The second problem with accurate matching involves resolving attribute names (not values) between different data sources. For example, an employees first name may be stored in an attribute "First_Name" in an HR database, and again in an attribute "name_1" in a name and address book. Of course, combinations of the two problems can occur, such as First_Name="Robert"

and name1="Bob".

As previously discussed, many existing metadirectory products do not attempt to resolve these synonyms and matching problems automatically, but provide an administrator tool to make the matches manually. However, our metadirectory allows for the addition of matching and joining logic, rules and relationships through the use of matching plug-ins (44), preferably in the form of Java beans and extensible markup language ("XML"). Using these matching definitions and logic, the attribute naming conventions local to the individual data sources may be maintained, and master, slave and peer roles can be customized.

Figure 5:
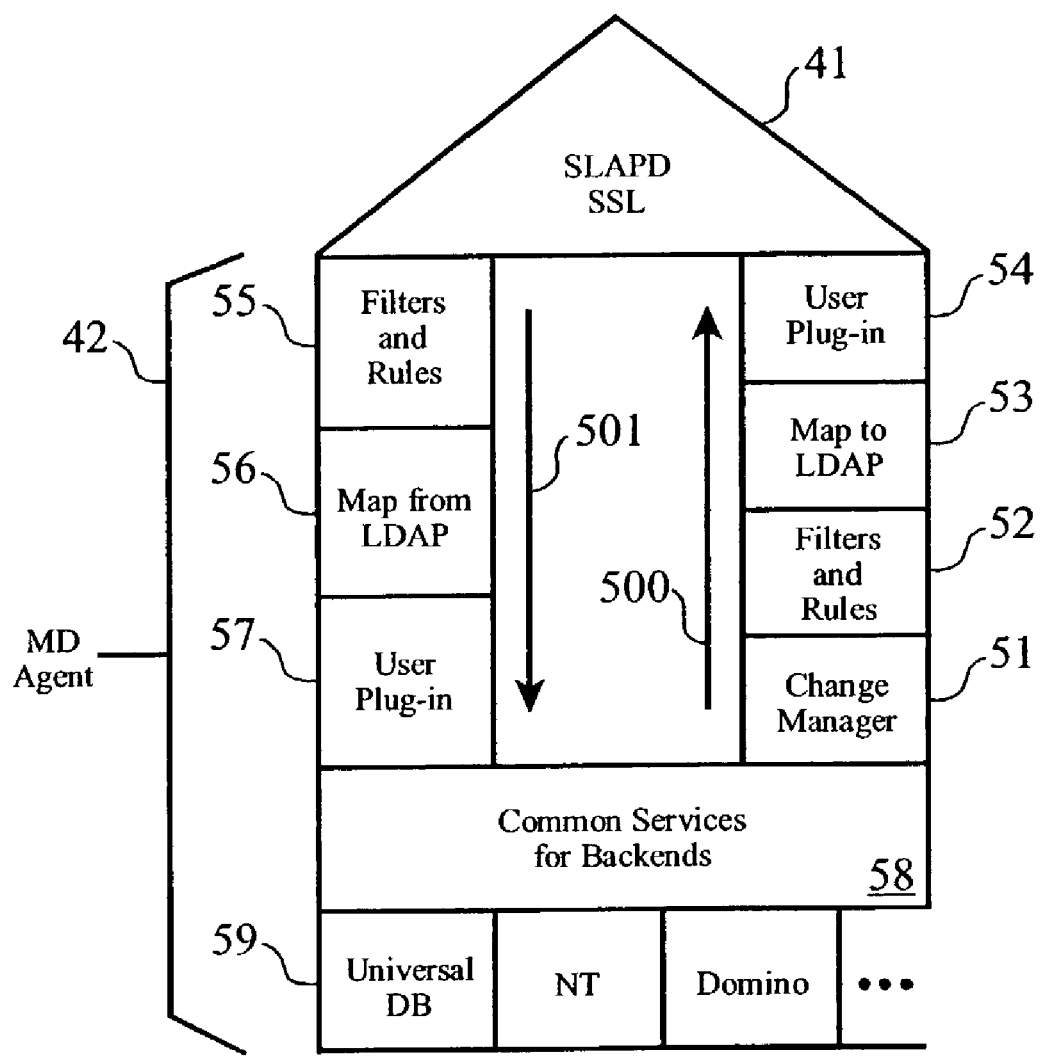
FIG. 5 provides details of the components of a metadirectory agent.

Turning to FIG. 5, more detail of the directory-agnostic metadirectory agent (42) is shown, which is configurable using any appropriate object-oriented programming technology, such as PERL, Java, Visual Basic, or Python. It is a bi-directional stack of services, with data source specific interfaces (59) to a common services (58) function. Changes which are being reported from the data source to the metadirectory (500), are first converted from the data source specific protocol by a DS interface (59) to an internal common format, handled by the common services (58), and received by a change manager (51).

The change manager keeps track of changes and logs them to a change log. The filters and rules (52) allow for a definition of what is to be exported to the metadirectory and what is to be blocked from export. Then, the changes are mapped from the local set of attribute names to the metadirectory attribute names and put into LDAP protocol format, preferably using XML-based schema mapping.

Another stage of processing for user customization (54) through extensions or plug-in functions is provided, prior to submitting the change to an LDAP daemon ("SLAPD") (41), which in turn communicates the change to the metadirectory, preferably using secure sockets protocol ("SSL").

Changes being propagated from the metadirectory (e.g. from the Joiner) to the data source are received (501) by the metadirectory agent (42) from the SLAPD (41). The filters and rules (55) are applied to insure that only items allowed to be changed by the metadirectory are implemented. Then, the change operation is mapped from the LDAP protocol to the common services format, after which any customization plug-ins may be executed. The change operation is then handled by the common services (58) and passed to the data source specific interface (59). The DS interface (59) then converts it from the common services format to a command (or set of commands) directly compatible with the specific data source.

The change manager is, in one embodiment, "application assisted" to approximate real-time response to changes in the data source, and it employs a plug-in architecture for associated triggers. The change logging can be periodic or polled, or may be driven by events or changes. In its simplest form, the change log is a text-based file.

Figure 6:
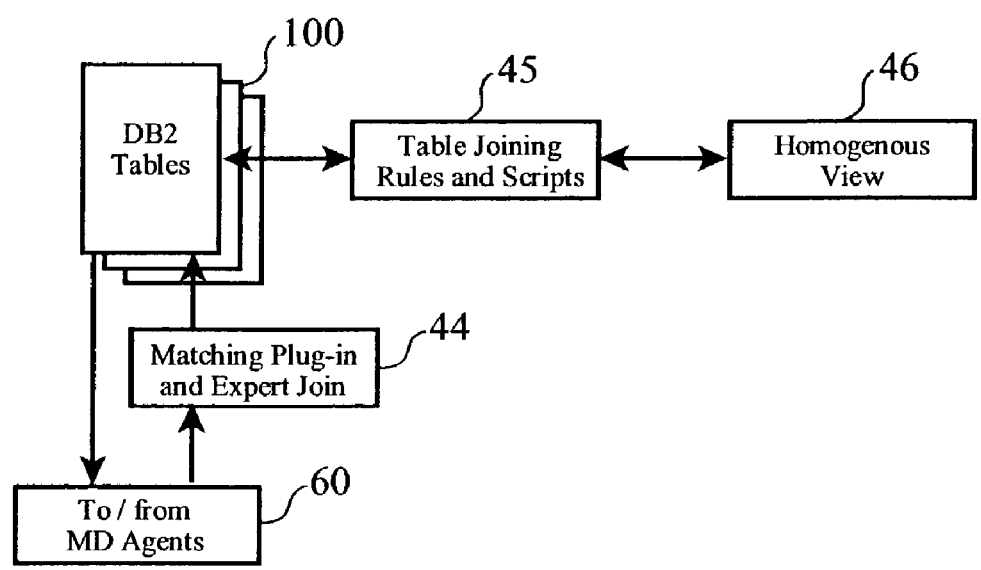
FIG. 6 shows the logical process of one embodiment of the metadirectory agent.

In FIG. 6, a functional arrangement between the DB2 tables (100), the matching plug-in and expert joiner (44), table joining functions (45) and the homogenous joined table (46) is presented. Changes from the MD agents (from the data sources) are processed by the matching plug-in (44) to be stored in the tables (100) associated with the data source from which the change came. Then, the multiple tables (100) are joined by the joining logic (45) to create the JT homogenous view (46), as previously described. Changes which originate from the administrator via the homogenous view (e.g. via a Java-based user interface tool) are implemented into the data source tables (100), and then propagated out to the MD agents as described earlier.

Turning now the matching logic, as previously discussed, there are two problems to solve to effectively match and change entries in heterogeneous data sources—namely attribute name synonyms and attribute value synonyms. The following components and logical processes are realized as a Java bean extension(s) to a metadirectory Joiner function, such as the Joiner as previously described or an alternate Joiner function, in one possible embodiment. It will be readily apparent to those skilled in the art that alternate realizations are available, such as inline code changes or stand-alone application program implementation, without departing from the spirit and scope of the present invention.

Reviewing our example and illustration of the problems to be solved by a successful matching system, synonyms may be defined for the first name (e.g. given name), home telephone number, work telephone number and title for each data source in a match table.

One embodiment of the matcher plug-in uses a single match table for all the joined object classes. A match table name is specified with every joined object class for potentially implementing a plurality of match tables. So, in this example embodiment, all the match table names for all the object classes are specified as the same name. An example match table is shown in Table 3 in which synonyms for a dress book (NAB) and a human resources database are defined, both in names and in the attribute values.

TABLE 3

Example Match Table

| Rule | Attribute Name Synonyms | Attribute Value Synonyms |
|---|---|---|
| 1 | HR:First_name NAB:name1 | Rob*, Bob; Daniel, Danny, Dan; Liz, Elizabeth; |
| 2 | HR:Home_tel NAB:tele1 | 512-111-4321, 111-4321; 512-xxx-yyyy, xxx-yyyy; |
| 3 | HR:Work_tel NAB:tele2 | 512-999-8888, X8888, ext.8888; 512-xxx-yyyy, Xyyyy, ext.yyyy; |
| 4 | HR:Title NAB:position | supervisor, "group supervisor" |

Figure 8:
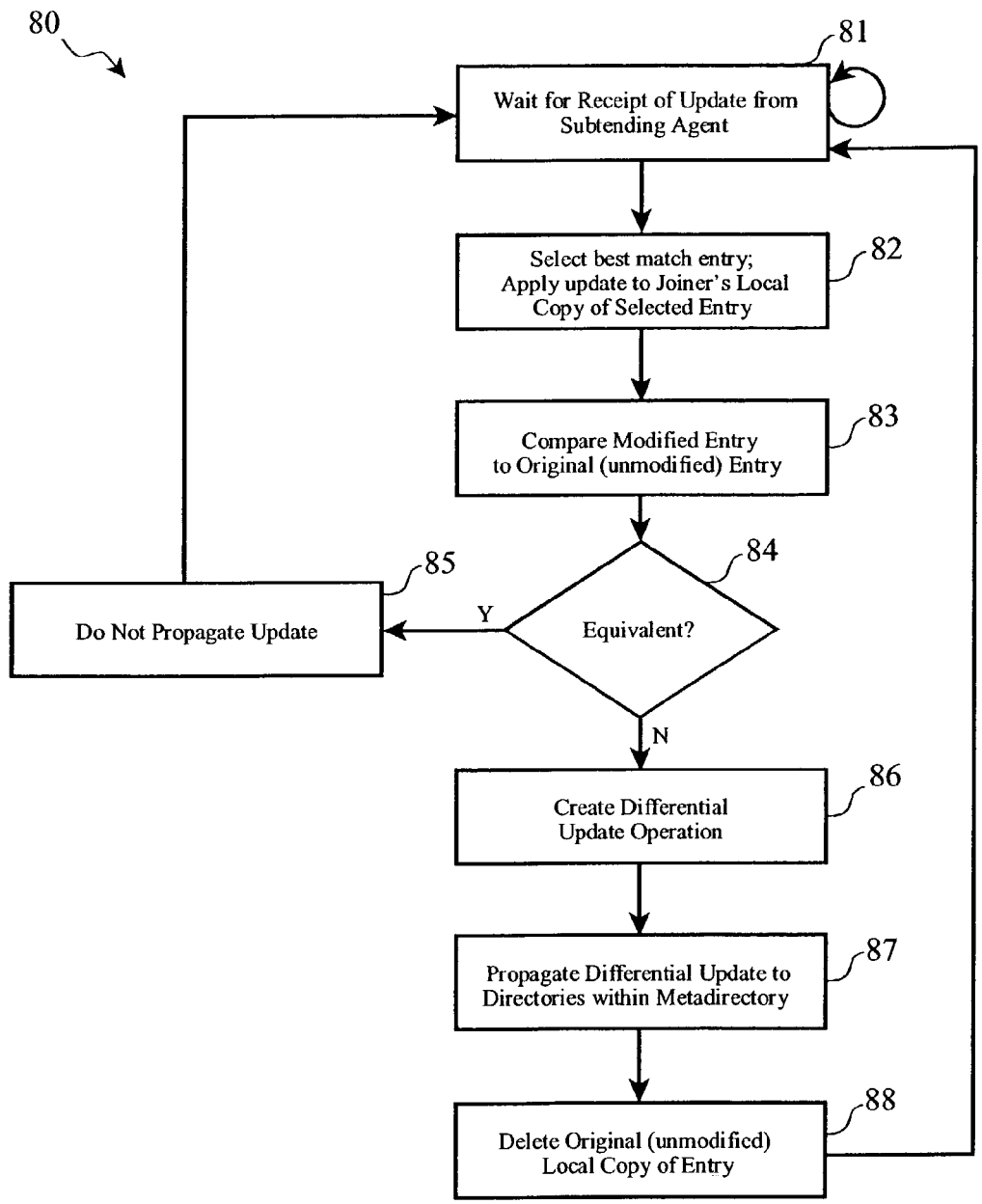
FIG. 8 sets forth a high-level logical process of the metadirectory change generation.

FIG. 8 shows an embodiment of a high-level logical process (80) for generating and propagating changes to data sources in a metadirectory. As previously discussed, the Joiner normally stores local copies of entries from the directories being managed by the metadirectory. When the Joiner receives an update operation (81) for an entry in a directory, it performs an "apply" operation (82) on a selected entry in the metadirectory local table, creating a temporary modified entry containing the result of the update.

This temporary modified entry is not written to the secondary storage (e.g. propagated to the other joined directories), however. The modified entry is compared (83) with the original (unmodified) entry to identify the differences between the original entry and the updated entry.

If there are no differences between the original entry and the updated entry (84), no updates are propagated to other directories in the metadirectory, and the temporary local entry is deleted.

If there are differences (84), then a differential update operation is created (86) containing only the changed fields in the entry and omitted the operations which result in no net change to a field. This differential update is then propagated (87) to the other directories in the metadirectory, and the original (unmodified) local copy of the entry is replaced by the temporary (updated) copy of the entry. As each of the content formats of the joined objects and directories of the metadirectory may be in different formats (e.g. NAB, DB2, etc.), in order to implement the differential change to the affected items, different update operations must be executed for different format objects and directories. The differential update is propagated in a common format, preferably LDAP, and converted to the necessary format of each joined object and directory by the metadirectory agents.

In this example embodiment, an entry class is implemented to store the distinguished name and all the attributes that make the entry. These attributes are sorted in alphabetical order by attribute name. As a result, the "apply" operation which applies the updates sent in from a directory to the Joiner is extremely efficient.

The "difference" operation, consequently, contains the minimal set of update or change operations that need to be applied to transform the original entry to the new entry, which increases time responsiveness and bandwidth consumption efficiency in the metadirectory.

Further in this example embodiment, the application programming interface ("API") is mapped to the LDAP API. So, a metadirectory agent that is responsible for propagating changes made in a directory to the Joiner records the changes as LDAP operations, such as LDAP "add", "delete" or "modify".

The following example illustrates the operation of the metadirectory, wherein a phone number in an entry for a person "John Smith" in a Human Resources database at XYZ corporation is to be updated to 838-1180, and his department is to be changed to department 6. The original entry with five fields may appear as shown previously in Table 1. Records in the change log created by the metadirectory agent that reflect the change to the entry as the LDAP modify operation were shown in Table 2.

When the change is sent to the Joiner by the metadirectory agent, the Joiner applies the changes to the original entry that it has stored locally to create a new (temporary) entry. After determining the difference between the old entry and the new entry, the Joiner creates a differential update LDAP operation as shown in Table 4.

TABLE 4

Differential Update LDAP Operation

DN:cn=John Smith, ou=Austin, o=xyz,
changetype:modify
replace:PhoneNumber
    PhoneNumber:838-1180

TABLE 4-continued

Differential Update LDAP Operation changetype:modify
replace:Department
Department:6

This differential update operation is then propagated by the Joiner to the other directories within the metadirectory. It is readily apparent from this simple example that the propagation bandwidth is reduced, and the update processing requirements are reduced by this differential update technique. In practice, most entries have many more than 5 fields, and updates may occur to many entries in a given time period, which multiplies the advantage of the invention.

The step of selecting a local table entry upon which to apply the update operation for comparison purposes first employs a user-configurable synonym dictionary, including match tables, to allow for the reduction of multiple operations to records containing synonyms in keys or fields and to assist in the selection of one best matching entry from multiple matching entries, in this example embodiment.

This matching logic, which consults the synonym dictionary or "match table(s)", is executed before examining the changes in a change log for a data source to reduce it to a minimal set of changes.

Figure 7:
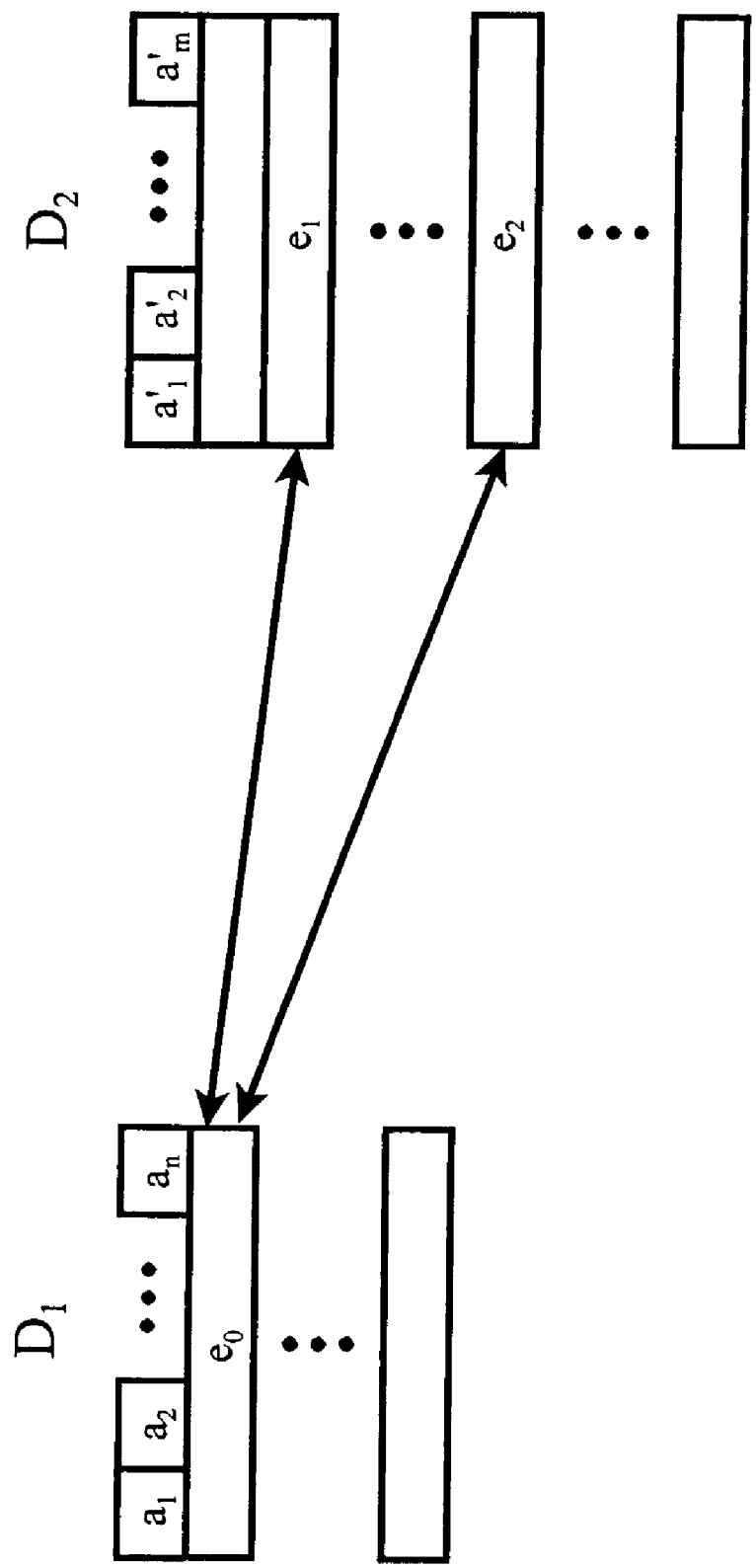
FIG. 7 provides an example of a multiple-entry match for illustrative purposes.

For illustrative purposes, FIG. 7 provides some example entries in two data sources, $D_1$ and $D_2$. Suppose also, for purposes of this example, that data source $D_1$ is the metadirectory copy of the entry to be matched, and the second data source $D_2$ is the data source to be searched for matching entries. Also suppose that there are several attributes, $a_1$ through $a_n$, in data source $D_1$, which are mapped to attributes $a_1'$ through $a_m'$ in data source $D_2$. Perhaps, $a_1$ may be "First_name" in data source $D_1$ which is mapped to "name1", or $a_1'$, in data source $D_2$. Further for this illustration, suppose that entry $e_0$ is the entry or record (e.g. set of attribute values) to be matched in $D_2$, and that records $e_1$ and $e_2$ of $D_2$ both match attribute $a_1$ in $e_0$, such as:

$e_0(a_1)$="Kris";
$e_1(a_1')$="Chris"; and
$e_2(a_1')$="Krishna"; all of which are defined as attribute value synonyms.

In most situations, it is unlikely that data source $D_2$ actually contains two records for the same person "Kris", so this match is not completely resolved based on the typical fundamental rules of matching. Most metadirectory products would simply record this match discrepancy and report it to an administrator for the administrator to resolve manually.

However, the matching process of the invention eliminates much of this incapability to resolve a match by providing a weighted matching approach in which multiple attributes can be matched to determine a more likely match. For example, further assume that attribute $a_5$ of data source $D_1$ is "Title", and that $a_5'$ of data source $D_2$ is "Position". So, the two attributes can be mapped to each other, and a weight can be assigned to the match between those attributes. Assuming a weight of 0.9 to "First_name" and 0.6 to "Title", and the following example records $e_0(a_1, \ldots, a_5)$=("Kris", \ldots, "Manager");
$e_1(a_1', \ldots, a_5')$=("Chris", \ldots, "Contractor") ; and
$e_2(a_1', \ldots, a_5')$=("Krishna", \ldots, "Supervisor");

and assuming that "Manager" and "Supervisor" are defined as synonyms, a combined "score" or weight can be assigned between $e_0$ and $e_1$ of 0.9 (matches in First_name only), and between $e_0$ and $e_2$ of 1.5 (matches in both First_name and Title). This process can be normalized, if desired, by dividing the score by the number of attributes mapped and compared (such as dividing by 2 in this example), and a threshold may be set which, if exceeded, is indicative of a match. This process can be extended to include any number of attributes in the comparison with each attribute with a specific weight assignment.

Figure 9:
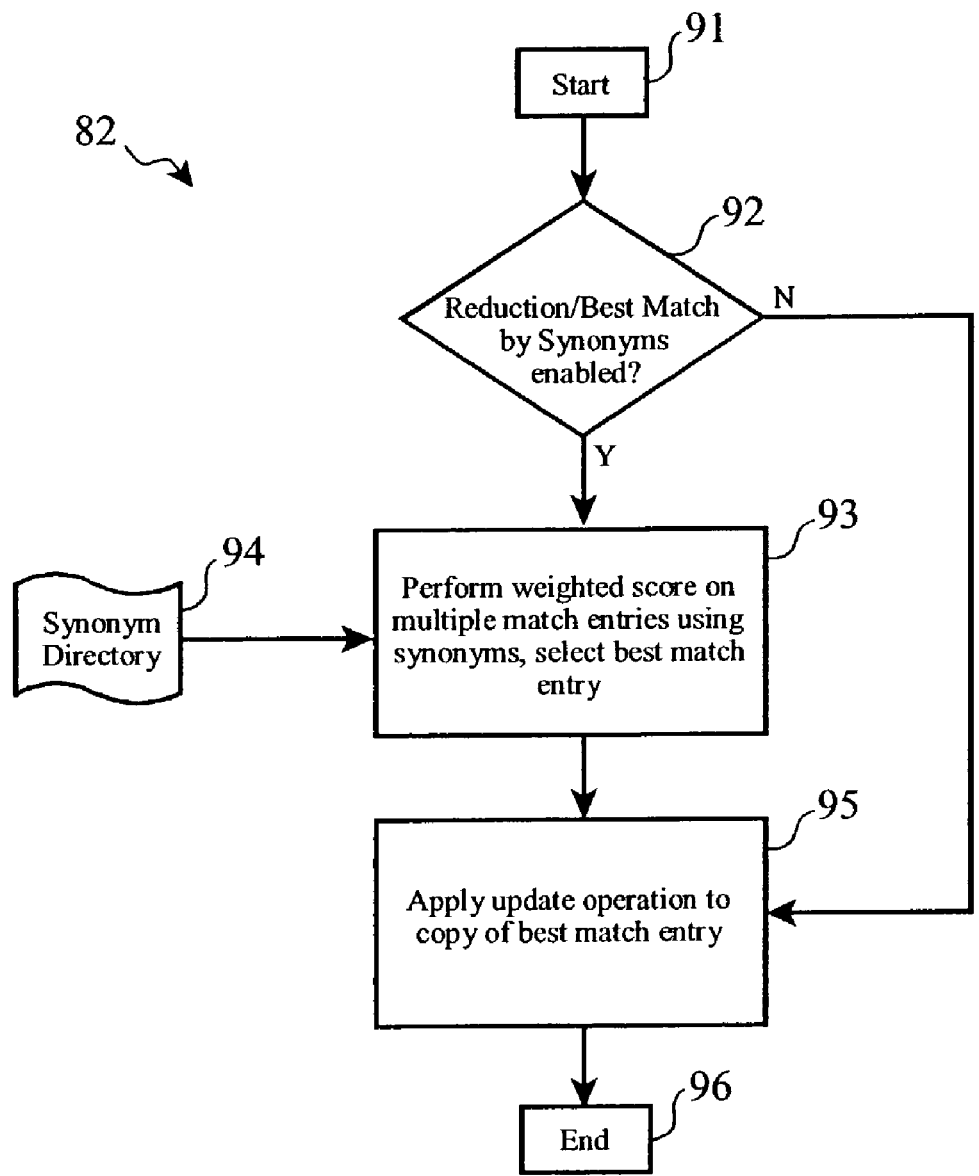
FIG. 9 shows detail of a logical process of generating performing a weighted score on multiple entry matches.

Turning to FIG. 9, a logical process (82) according to one possible embodiment to apply the weighted score to multiple-match entries is shown in more detail. When the process is started (91), a check is made to see if reduction and matching by synonyms is enabled (92), and if so, the weighted scoring as previously described is performed (93) using the administrator-configurable synonym dictionary (94) for all entries which match values in mapped attributes such that only the one best matching entry is selected.

Now that a single, best match entry is selected, the change or update is applied (95) to a temporary copy of the selected entry.

Processing proceeds as shown in FIG. 8 by comparing (83) the updated entry is the original (unmodified) selected entry. Then, if there is a net change to the entry due to the update (e.g. the temporary copy is not equivalent to the original copy), processing continues to generate (86) a differential update operation and to propagate (87) that operation to other directories within the metadirectory.

Optionally, multiple entries in a directory which refer to the same entity because the fields or keys in these entries are synonymous can be flagged or marked. This may allow an administrator to review the marked entries, select a single entry that best represents the synonymous entity, and delete the other entries in the directory. This reduces the number of entries that need to be administered in a directory and the number of change log entries that are generated.

In a first aspect of our metadirectory agent, a stack with layers is defined that can be used to provide function for metadirectory operations, as well as allow for security features and personalization, as previously discussed and illustrated in FIG. This allows the same configurable building blocks which can be used for metadirectories to be used to implement portals. This allows the metadirectory and portal to aggregate information from a variety of sources and provide a unified, personalized view of this information to users.

Our architecture for metadirectory agents also allows agents to be useful both on a client device as well as a server device. The general purpose layers of the same metadirectory agent can be executed on a client, on a directory server, or it may be integrated with an application program. The metadirectory functionality can be integrated with an application by treating it as another backend process. Integrating with applications may be useful as some portal servers need to interoperate with an enterprise's existing workflow and business process applications Our metadirectory's ability to push notifications of changes to a variety of devices, such as PDA's, WAP devices, is useful, as well. In practice, some servers "push" notifications to devices. Our metadirectory provides the ability to work from a portal server to a device, as well as from one portal server to another portal server, which provides for personalization such as inserting a rule engine into the stack. A portal server may be enhanced using our metadirectory by allowing for post-processing of changes or updates sent to a device. In addition, our metadirectory has the ability to push notifications of changes to a variety of directories as well as to devices.

Security features may be provided with our metadirectory through "plug-ins" which allow for user authentication and access checks. These are useful for both metadirectories and for portal servers. The invention solves two problems here through a security plugin in the agent stack. The first problem is that of authenticating and performing access checks before allowing a user access to the information. The second problem is that of ensuring that in a peer-to-peer portal server exchange, the contents are digitally signed to protect against tampering for authentication and data integrity.

Figure 10:
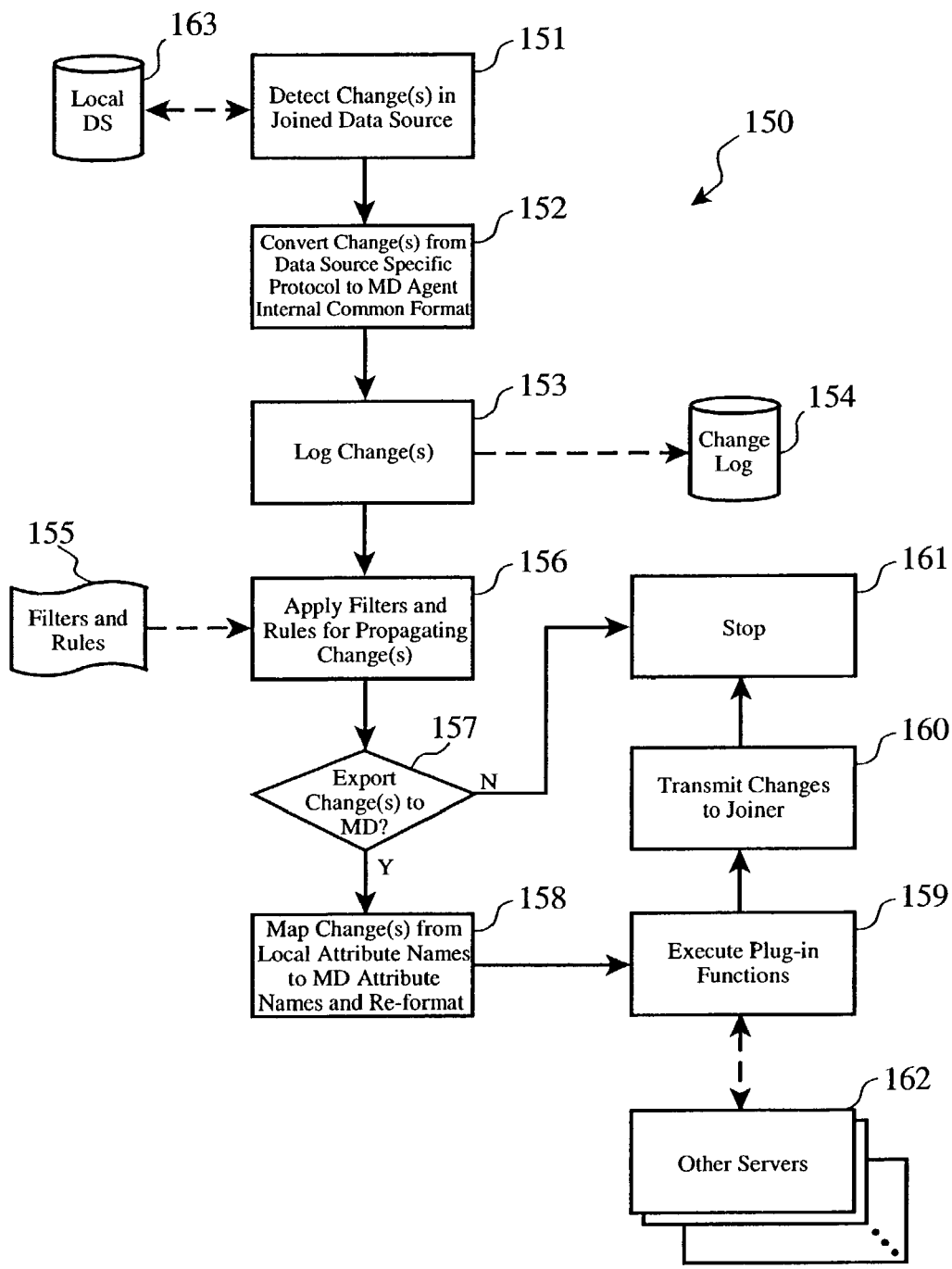
FIG. 10 provides a logical process illustration as performed by a metadirectory agent when propagating a change.

To understand how these capabilities of our metadirectory architecture and agents accomplish these functions, we return our discussion to the details of the metadirectory agents. With more particular attention to the processes of our Metadirectory Agent organized as shown in FIG. 5, FIG. 10 illustrates a logical process embodiment in which a change in a local data source (163) is detected (151). The change is converted (152) from a protocol specific to the local data source to an internal format used within the metadirectory agent. The change is then logged (153) into a change log (154), and any filters and/or rules (155) for propagating the change throughout the metadirectory are applied (156).

If (157) the change is to be propagated according to the rules and filters, then the changes are mapped (158) from local attribute names to metadirectory attribute names, and it is reformatted. User plug-in functions may then be processed (159) during which other networked servers or processes may be involved (e.g. communications with other servers and processes may be performed by a plug-in). Finally, the change is transmitted (160) to the Joiner.

Figure 11:
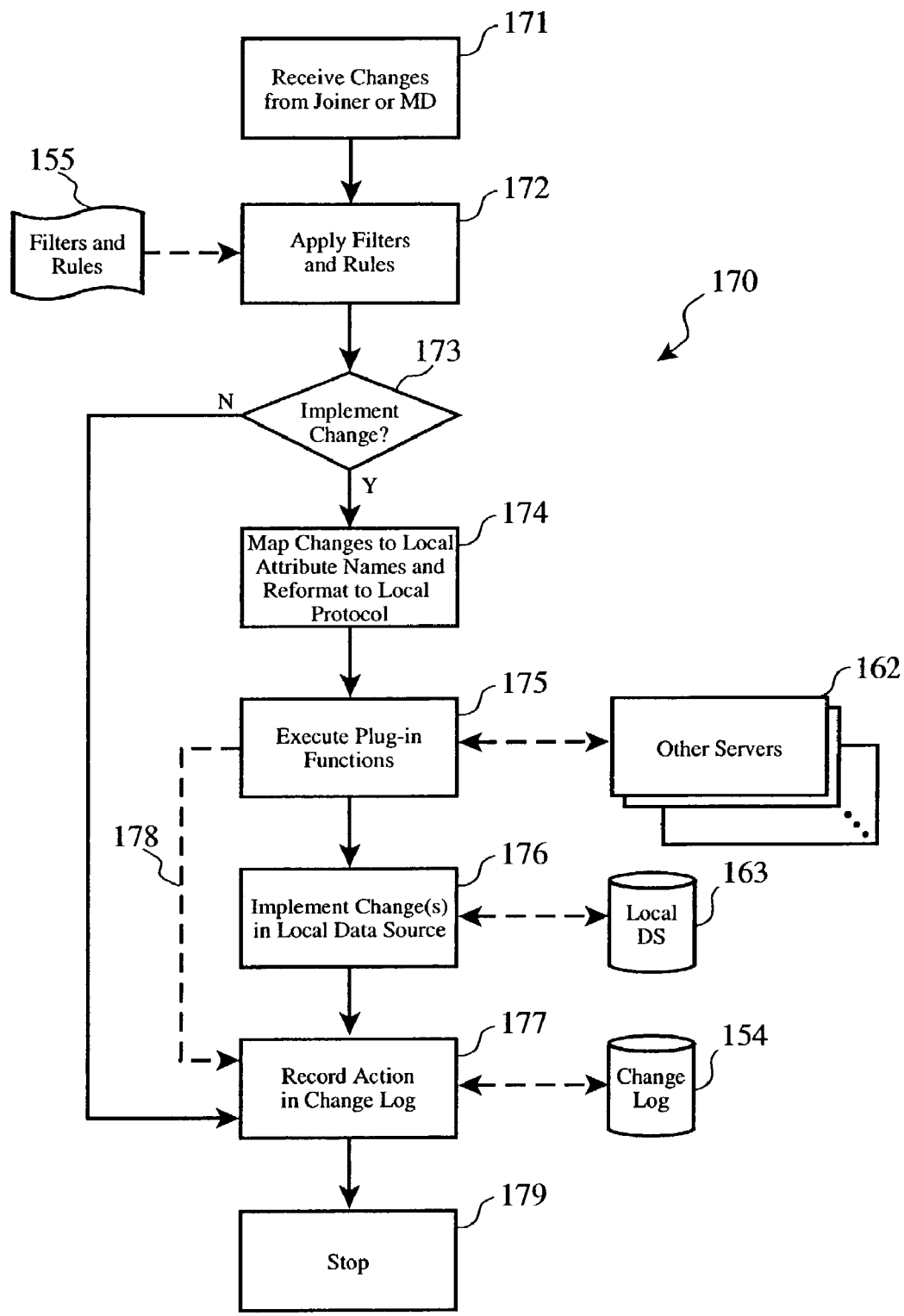
FIG. 11 provides a logical process illustration as performed by a metadirectory agent when receiving a change.

FIG. 11 shows an example embodiment of a logical process to receive a propagated change from a metadirectory to a local data source as provided by our metadirectory agent. When a change is received (171) from the joiner or other portion of the metadirectory, filters and rules (155) may be applied (172) to determine if the change should be implemented (or rejected). If the change is to be implemented (173), the change or changes are mapped (174) to the local data source's attribute names, and the change is reformatted into the protocol of the local data source.

Plug-in functions may then be executed (175), during which other networked servers (162) or processes may be involved in the processing via communications with those servers or processes. Finally, the changes are implemented (176) in the local data source (163), and the change is recorded (177) in a change log (154).

Two functions are now provided through leveraging of the metadirectory agent architecture just described. First, a portal into the metadirectory via a portal server is provided. Second, peer-to-peer security is provided which allows a metadirectory agent to verify that a received change is actually from a trusted source and has not been altered.

Figure 14:
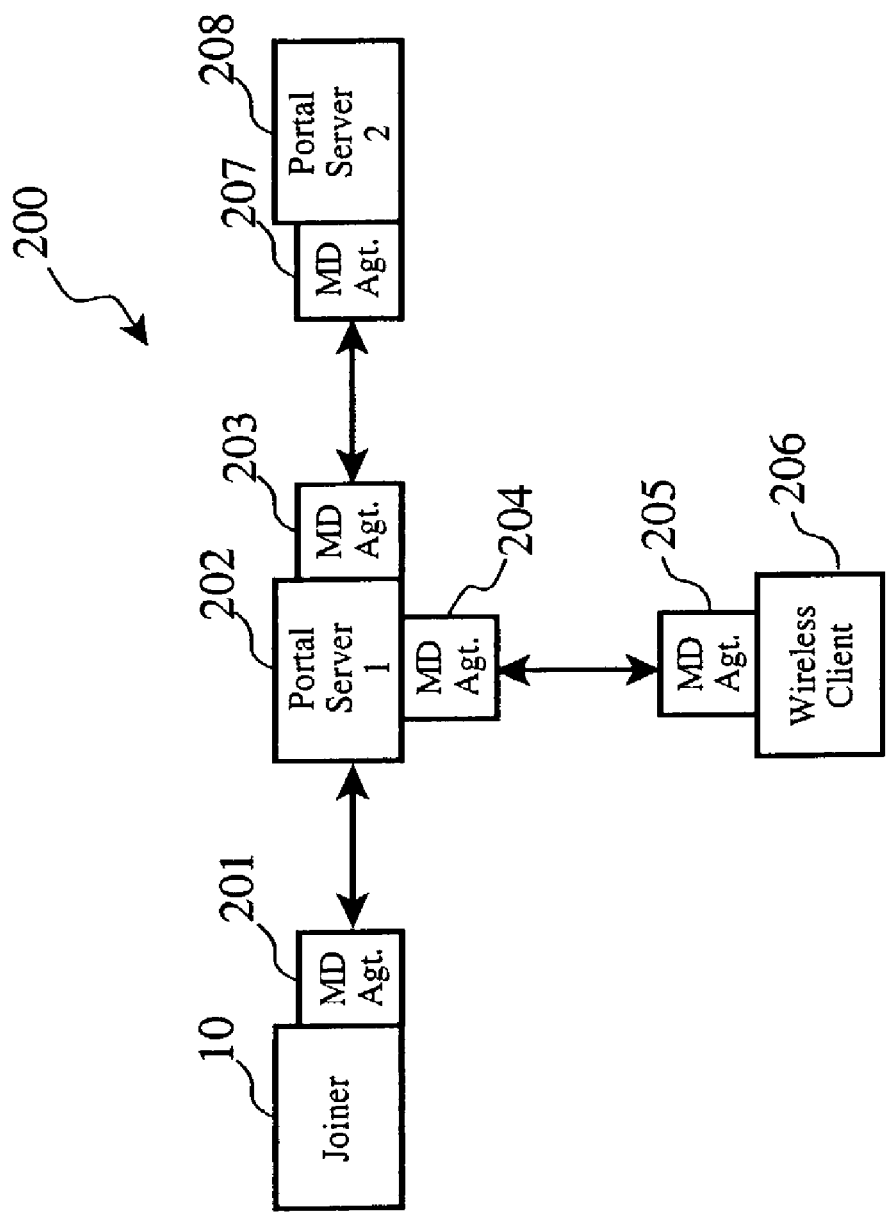
FIG. 14 shows an arrangement of systems and components to provide portal server capabilities to a metadirectory.

Addressing the portal functionality first as its description will support an understanding of the peer-to-peer security function as well, FIG. 14 provides an illustration of one possible embodiment of a system which provides a portal into a metadirectory. A portal in the conventional meaning of the term currently used in information technology and e-business parlance is a system or server through which a user may access a variety of data or services online. For example, a travel planning web site may be viewed as a portal to separate systems such as an airline reservation system, a car rental system, and a tourist information database.

In our example of FIG. 14, a wireless client (206) such as a wirelessly networked personal digital assistant ("PDA") is to be used to access a variety of data. Suppose for this example that this variety of data is investment and business related data, such as transaction records, news stories, company profiles, and real-time ticker information.

This type of heterogeneous information, then, is suitable for placing into a metadirectory as previously described. Additionally, the metadirectory's joiner (10) is provided with a metadirectory agent (201) which communicates to a first portal server (202). The metadirectory agent is "adapted" to communicate with the portal server using a plug-in compatible with the portal server's communications capabilities. For example, a portal server may be capable of communication using TCP/IP protocol. Another portal server may be transaction oriented (e.g. a stock buy and sell system), and may communicated using the Electronic Data Interchange ("EDI"). Essentially, any communication protocol or scheme (i.e. HTTP, SSL, EDI, e-mail, TCP/IP, etc.) can be integrated into the metadirectory agent's architecture through the use of the plug-in, as previously illustrated. This, then, allows a metadirectory not only to integrated data sources of different types and formats, but also to integrate communications capabilities of different types.

Further, the portal server may be provided with a metadirectory agent (204) to communicate with a metadirectory agent (205) on the client systems (206). This completes a communication path between the metadirectory and the client. As such, the client may receive information from any of the data sources within the metadirectory, and may submit changes or transactions to the metadirectory for propagation throughout its data sources.

For example, the client may submit an address change for an investor, resulting in the automatic update of all the corresponding records and instances of his or her address in his bank account, online investment account, travel profile, etc., all of which are included in the metadirectory. Similarly, the client may receive information as it changes within the metadirectory data sources, such as stock prices from a ticker reporting server, account balances and values from banks and investment houses, and news releases from a news service.

In the second new feature related to portal functionality of our metadirectory, peer-to-peer security is realized through use of plug-ins in the metadirectory agent. In the immediately previous example of a wireless client using a portal for financial information and transaction, the need for authenticating sources of metadirectory changes is illustrated. For example, while a client may authorize the movement of funds from one account to another included in the metadirectory, it is desirable to block or reject attempts from unauthorized sources to make such a change.

Figure 12:
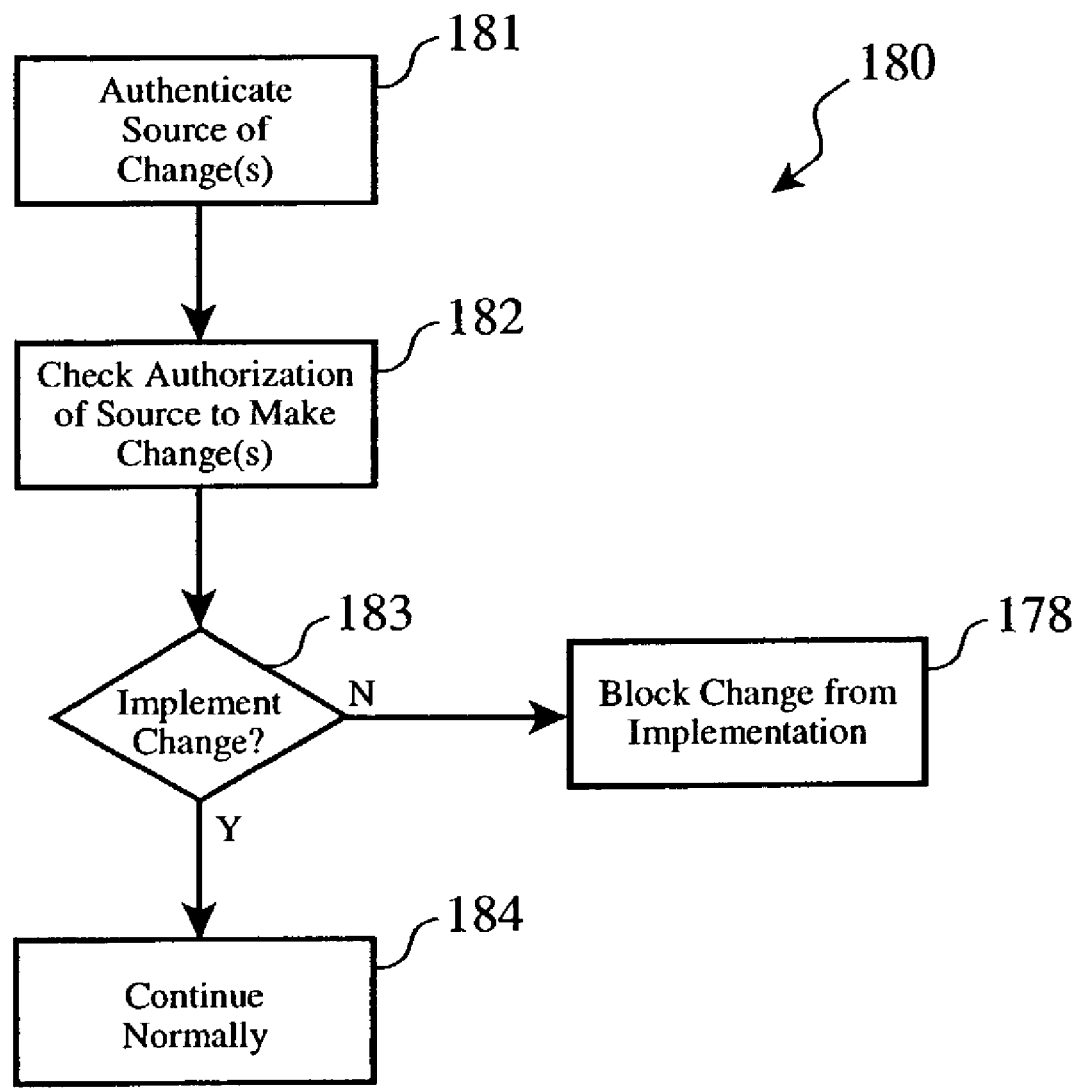
Figure 13:
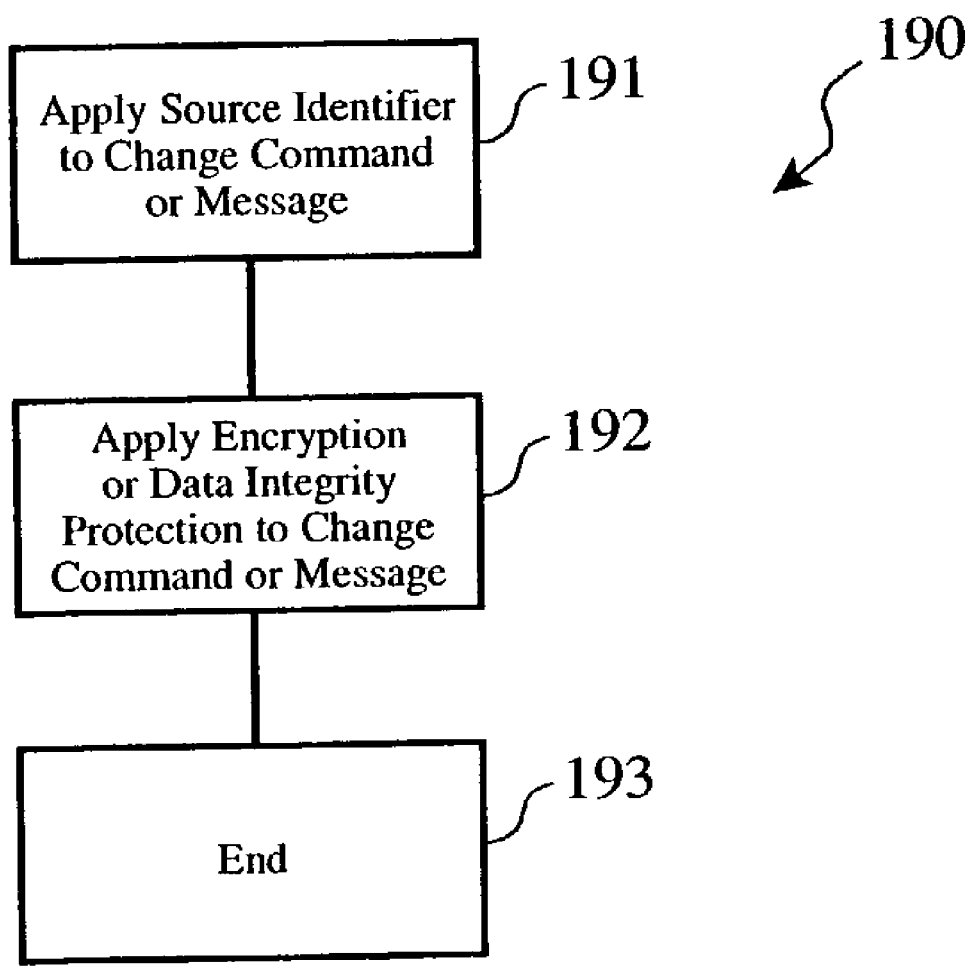

As such, a peer-to-peer ("P2P") security plug-in is provided having logical processes such as the examples in FIGS. 12 and 13. Turning to FIG. 12, when a change is received by a metadirectory agent, prior to implementation in the local data source, the plug-in authenticates (181) the source of the change, such as by communicating with an authentication service or server such as IBM's WebSphere authentication product. If the source is authentic, the source is checked for proper authorization to make the requested changes. This, too, may be performed by communication with an authorization server product such as IBM's WebSphere authorization product. Other forms of authentication and/or authorization may be utilized, such as simple name-and-password schemes, public key infrastructure ("PKI"), digital signatures, certificate exchange, etc. If the source is not authenticated or is not authorized to make the changed, the change implementation is blocked (178).

FIG. 13 shows a logical process for generating and propagating such a secure change, embodied in the metadirectory agent such as through a plug-in to the agent. An identifier (191) such as a digital signature (or name, or certificate, etc.) is applied to the change command or message by the metadirectory agent at the data source requesting (e.g. propagating) the change. Other forms of data privacy and integrity assurance may also be applied (192), such as encryption, cyclic-redundancy code generation ("CRC"), and the like. This enhanced change command is then propagated throughout the metadirectory, whereupon its receipt the corresponding security plug-in(s) of the recipient metadirectory agents will verify the authenticity and authorization of the change command.

It will be understood from the foregoing description that various modifications and changes may be made to the described embodiments without departing from the scope of the invention as defined by the following claims.

What is claimed is:

1. A bidirectional metadirectory agent comprising:
a data source converter layer portion of a sever configured to convert metadirectory change commands between a data source specific protocol and an agent-internal common format, and vice versa;
a filters and rules layer portion of a server configured to block changes which are not allowed to be exported to a metadirectory from the data source and which are not allowed to be implemented in the data source from an outside entity;
a mapping layer portion of a sever configured to translate attributes in change commands from a local set of attribute names to a set of metadirectory attribute names and vice versa, and for converting change commands between said agent-internal common format and a directory change protocol; and
a user customization layer portion of a server configured to implement custom metadirectory agent functions; and
a metadirectory interface portion of a server configured to send and receive said change commands in said directory change protocol to and from one or more systems selected from the group of a metadirectory joiner, a metadirectory data source, a portal sever, and a client interface.

2. The agent as set forth in claim 1 wherein said mapping layer is configured to convert change commands between said agent-internal common format and Lightweight Directory Access Protocol.

3. The agent as set forth in claim 1 wherein said metadirectory interface comprises a secure socket layer communications interface.

4. The agent as set forth in claim 1 wherein said user customization layer comprises one or more plug-in functions.

5. The agent as set forth in claim 1 wherein said user customization layer comprises a portal server communications function.

6. The agent as set forth in claim 5 wherein said portal server communications function comprises a plug-in function.

7. The agent as set forth in claim 1 wherein said client interface comprises an application program back-end.

8. The agent as set forth in claim 1 wherein said user customization layer comprises a change notification push function which pushes change commands from a portal server to a system selected from the group of a client device, another portal server, a metadirectory joiner, and a metadirectory data source.

9. The agent as set forth in claim 1 wherein said user customization layer comprises a personalization rule engine for additional restriction of change command blocking according to a user's preferences.

10. The agent as set forth in claim 1 wherein said user customization layer comprises a post-processing function for subsequently processing changes and updates which have been previously transmitted to a client device.

11. The agent as set forth in claim 1 wherein said user customization layer comprises a security function.

12. The agent as set forth in claim 11 wherein said security function comprises a user access authorization verification process.

13. The agent as set forth in claim 11 wherein said security function comprises a change requestor authorization service.

14. The agent as set forth in claim 13 wherein said change requestor authorization process comprises a digital signature verifier.

15. The agent as set forth in claim 11 wherein said security function comprises a data integrity assurance function.

16. The agent as set forth in claim 11 wherein said security function comprises a peer-to-peer communications interface.

17. A method comprising:
converting by a portion of a metadirectory agent server change commands between a data source specific protocol an agent-internal common format and vice versa;
filtering and blocking by a portion of a metadirectory agent server change commands according to a first set of rules which define conditions for allowing and blocking change commands to be transmitted by the metadirectory agent from a local data source and change commands to be implemented in the local data source;
mapping by a portion of a metadirectory agent server attributes in said change commands from a local set of attribute names to a set of metadirectory attribute names and vice versa;
converting by a portion of a metadirectory agent server change commands from said agent-internal common format to a directory change protocol and vice versa;
performing by a portion of a metadirectory agent server one or more custom metadirectory agent functions; and
transceiving by a portion of a metadirectory agent server said change commands in said directory change protocol to and from one or more systems selected from the group of a metadirectory joiner, a metadirectory data source, a portal server, and a client interface.

18. The method as set forth in claim 17 wherein said mapping comprises converting change commands from said agent-internal common format and Lightweight Directory Access Protocol and vice versa.

19. The method as set forth in claim 17 wherein said transceiving of said change commands further comprises communicating using a secure socket layer protocol.

20. The method as set forth in claim 17 wherein said performance of a custom metadirectory agent function comprises executing one or more plug-in functions.

21. The method as set forth in claim 17 wherein said performance of a custom metadirectory agent function comprises performing communications with a portal server.

22. The method as set forth in claim 21 wherein said portal server communications comprises a executing a plug-in function.

23. The method as set forth in claim 17 wherein said client interface comprises providing an application program back-end.

24. The method as set forth in claim 17 wherein said performance of a custom metadirectory agent function comprises pushing change commands from a portal server to a system selected from the group of a client device, another portal server, a metadirectory joiner, and a metadirectory data source.

25. The method as set forth in claim 17 wherein said performance of a custom metadirectory agent function comprises providing a personalization rule engine for additional restriction of change command blocking according to a user's preferences.

26. The method as set forth in claim 17 wherein said performance of a custom metadirectory agent function comprises post-processing updates and changes which have been previously transmitted to a client device.

27. The method as set forth in claim 17 wherein said performance of a custom metadirectory agent function comprises performing a security function.

28. The method as set forth in claim 27 wherein said security function comprises performing a user access authorization verification process.

29. The method as set forth in claim 27 wherein said security function comprises performing change requestor authorization.

30. The method as set forth in claim 29 wherein said change requestor authorization process comprises verifying a digital signature.

31. The method as set forth in claim 27 wherein said security function comprises performing data integrity assurance.

32. The method as set forth in claim 27 wherein said security function comprises performing peer-to-peer communications.

33. A computer readable medium encoded with software for a bidirectional metadirectory agent, said software performing a process comprising:
   converting change commands between a data source specific protocol an agent-internal common format and vice versa;
   filtering and blocking change commands according to a first set of rules which define conditions for allowing and blocking change commands to be transmitted by the metadirectory agent from a local data source and change commands to be implemented in the local data source;
   mapping attributes in said change commands from a local set of attribute names to a set of metadirectory attribute names and vice versa;
   converting change commands from said agent-internal common format to a directory change protocol and vice versa;
   performing one or more custom metadirectory agent functions; and
   transceiving said change commands in said directory change protocol to and from said metadirectory agent.

34. The medium as set forth in claim 33 wherein said software for mapping comprises software for converting change commands from said agent-internal common format and Lightweight Directory Access Protocol and vice versa.

35. The medium as set forth in claim 33 wherein said software for transceiving of said change commands further comprises software for communicating using a secure socket layer protocol.

36. The medium as set forth in claim 33 wherein said software for performance of a custom metadirectory agent function comprises software for executing one or more plug-in functions.

37. The medium as set forth in claim 33 wherein said software for performance of a custom metadirectory agent function comprises software for performing communications with a portal server.

38. The medium as set forth in claim 37 wherein said software for portal server communications comprises software for executing a plug-in function.

39. The medium as set forth in claim 33 wherein said software for conversion of change commands between a data source specific protocol and an agent-internal common format and vice versa comprises software for interfacing to client for communications between a client device and a system selected from the group of a metadirectory joiner, metadirectory data source, and portal server.

40. The medium as set forth in claim 39 wherein said software for interfacing to a client interface comprises software for providing an application program back-end.

41. The medium as set forth in claim 33 wherein said software for performance of a custom metadirectory agent function comprises software for pushing change commands from a portal server to a system selected from the group of a client device, another portal server, a metadirectory joiner, and a metadirectory data source.

42. The medium as set forth in claim 33 wherein said software for performance of a custom metadirectory agent function comprises software for a personalization rule engine for additional restriction of change command blocking according to a user's preferences.

43. The medium as set forth in claim 33 wherein said software for performance of a custom metadirectory agent function comprises software for post-processing updates and changes which have been previously transmitted to a client device.

44. The medium as set forth in claim 33 wherein said software for performance of a custom metadirectory agent function comprises software for performing a security function.

45. The medium as set forth in claim 44 wherein said software for a security function comprises software for performing a user access authorization verification process.

46. The medium as set forth in claim 44 wherein said software for a security function comprises software for performing change requestor authorization.

47. The medium as set forth in claim 46 wherein said software for change requestor authorization comprises software for verifying a digital signature.

48. The medium as set forth in claim 44 wherein said software for a security function comprises software for performing data integrity assurance.

49. The medium as set forth in claim 44 wherein said software for a security function comprises software for performing secure peer-to-peer communications.

* * * * *